US008016687B2

(12) United States Patent
Martin et al.

(10) Patent No.: US 8,016,687 B2

(45) Date of Patent: Sep. 13, 2011

(54) PARLOR GAME

(75) Inventors: John R. Martin, Rockford, IL (US); Patrick G. Rice, Loves Park, IL (US); Thomas P. Myers, Machesney Park, IL (US); Richard F. Jones, Rockford, IL (US)

(73) Assignee: Arachnid Inc., Rockford, IL (US)

( * ) Notice: Subject to any disclaimer, the term of this patent is extended or adjusted under 35 U.S.C. 154(b) by 971 days.

(21) Appl. No.: 11/940,372

(22) Filed: Nov. 15, 2007

(65) Prior Publication Data

US 2009/0131186 A1 May 21, 2009

(51) Int. Cl.
*G06F 17/00* (2006.01)

(52) U.S. Cl. ........................................................ 473/24

(58) Field of Classification Search .................... 473/24, 473/25, 28, 30, 6; 463/29, 39
See application file for complete search history.

(56) References Cited

U.S. PATENT DOCUMENTS 4,516,770 A 5/1985 Brookes et al.
4,948,128 A 8/1990 Emery, II et al.
5,026,053 A * 6/1991 Paterson et al. ................. 473/23
5,302,154 A * 4/1994 Sundstrom et al. ............. 473/24
5,653,640 A * 8/1997 Shirley, Jr. ......................... 473/2
7,198,909 B1 * 4/2007 Ron et al. ...................... 435/69.1
7,419,157 B2 * 9/2008 Giegerich et al. .......... 273/119 A
2004/0127283 A1 7/2004 Martin
2005/0130753 A1 * 6/2005 Giroux ............................... 473/4
2006/0121982 A1 6/2006 Martin

FOREIGN PATENT DOCUMENTS

AU 199944623 B2 3/2000

* cited by examiner

*Primary Examiner* — Ronald Laneau

(74) *Attorney, Agent, or Firm* — McAndrews, Held & Malloy, Ltd.

(57) ABSTRACT

A method for play of a parlor entertainment unit including a remote activation assembly and an activation-sensing unit. The activation-sensing unit, which may be battery operated and housed in the entertainment unit, may be in an energy-conserving sleep mode until the activation-sensing unit receives a wake-up signal. In one embodiment, the wake-up signal may be generated by the engagement of an activation mechanism, such as a coin slide. After being awoken, the activation-sensing unit may transmit an inquiry to the remote activation assembly as to whether the associated entertainment unit has been selected for play and/or whether there is a sufficient number of credits available for play. If that entertainment unit has not been selected for play, the activation-sensing unit may return to a sleep mode. However, if sufficient play credits are available for the entertainment unit, play may commence.

29 Claims, 10 Drawing Sheets

PARLOR GAME

BACKGROUND OF THE INVENTION

Embodiments of the present invention generally relate to entertainment systems, and more particularly to a system for, among other things, remotely activating an entertainment unit (including, but not limited to, a pool table, dart machine, or the like), and inputting information about the operation of an entertainment unit (for example, the game players and game score) into a computer database. Embodiments of the present invention also include a method of initiating operation of an entertainment unit and a method of inputting information about the operation of an entertainment unit into a computer database.

Coin operated pool tables (or pay-for-play pool tables) are widely used for a variety of pool games, such as eight ball, nine ball, snooker, and the like. Typically, a player hits a cue ball with a pool cue in an attempt to knock the cue ball into solid-colored and striped numbered balls. Depending on the rules of the particular game, a player "scores" by sinking the appropriate balls into pockets of the pool table.

In order to begin playing a game of pool, a player typically inserts coins into a coin acceptor located on the pool table. For example, the player may place coins into a coin slide and then push the coin slide into the coin acceptor. Once an amount sufficient to play a game is inserted, a holding rack that retains the colored balls within the pool table is opened, thereby allowing a player to access the balls. The balls are then placed on the playing surface of the pool table in order to begin play.

Typical pay-for-play tables only include a coin acceptor, but not a bill acceptor. This is because the use of a bill acceptor requires increased power and space. One of the obstacles to providing power to such bill acceptors is that most pool tables require unobstructed access from all sides of the table for game play. Further, a pool table usually requires a generous amount of floor space surrounding a table for game play. Electrical wires or cabling passing from the pool table to a wall outlet are obtrusive and pose tripping problems.

Entertainment units, such as pool-tables, may also use a battery to supply electrical power to the bill acceptor. However, because a bill acceptor may continuously drain battery power, even when the bill acceptor is not in use, a relatively large battery is typically required for operation. Moreover, the continuous drain of battery power by the bill acceptor typically necessitates the relatively frequent replacement of the large battery, thereby increasing operation costs.

Additionally, typical pool games are manually scored. Scoring games manually, however, may be inexact due to human error. Further, keeping track of scoring represents one more thing to be cognizant of during a game, and may be distracting to a player.

In addition, it is often necessary to manually schedule league matches between various individuals and/or teams, and to manually assign the particular game unit or table for each match. This can be time consuming for bar, arcade, or game parlor staff. Substantial paperwork and human resources may be devoted to tabulating and storing the results from a plurality of games, for example to generate league standings, and to display the results to interested persons. Similarly resources may also have to be devoted to coordinating and scheduling use of available game units during busy times.

SUMMARY OF THE INVENTION

Embodiments of the present invention provide an entertainment unit that allows a user to play pool upon receipt of a playing fee. More particularly, according to embodiments of the present invention, the system includes a pool table having a playing surface, rails, pockets, a ball holding rack that retains pool balls, an activation-sensing unit, and a remote activation assembly having a processor operatively connected to a currency acceptor, which is adapted to receive coins and/or bills.

The remote activation assembly transmits an activation signal that is received by the activation-sensing unit within the pool table when the processor of the remote activation assembly detects receipt of the playing fee, and wherein said activation-sensing unit receives the activation signal. The remote activation assembly may be mounted on a wall, or it may be supported by a floor, table, or counter. Further, the remote activation assembly may be powered through the use of electrical cables or wires that are operably connected to the electrical utility that is supplied to the facility. Additionally, the remote activation assembly and activation-sensing unit may include antennae that wirelessly receive power signals from a commercial radio station. Alternatively, the remote activation assembly may be a hand-held device that is powered by a battery.

The remote activation assembly may include a display to communicate information to the user. For example, the remote activation device may include a display that communicates to the user information such as the cost to play, the amount of money the user has inserted into the currency acceptor and/or the corresponding number of play credits purchased, and the location of a selected, assigned, or available entertainment unit.

According to one embodiment, the activation-sensing unit may include a controller, such as a micro controller or processor, and a communicator, for example an RF module. However, according to other embodiments, the activation-sensing unit may not include a controller. The activation-sensing unit may be operatively connected to a gate positioned at an end of the holding rack. The activation-sensing unit may act to open or unlock the gate when the activation-sensing unit receives the activation signal.

Embodiments of the present invention also provide a method for initiating game play on a pay-for-play pool table having a playing surface, rails, pockets, a ball holding rack that retains pool balls, and an internal activation-sensing unit. The method includes depositing a game play fee into a remote activation assembly, remotely transmitting an activation signal once the game play fee is deposited, receiving the activation signal at the internal activation-sensing unit, and providing access to the pool balls upon the receiving step.

Embodiments of the present invention also provide a method for initiating game play on a pay-for-play entertainment unit in which a battery powered activation-sensing unit is continuously in a sleep, hibernation, and/or stand-by mode, thereby conserving battery power. The activation-sensing unit may be powered by one or more batteries, which may or may or may not be rechargeable.

During sleep mode, at least some of the components of the activation-sensing unit may be shut down or draw minimal current so that battery power is conserved. The activation-sensing unit may remain in a sleep mode until the activation-sensing unit, and particularly the controller, receives a wake-up signal. Upon being awoken from the sleep-mode, for example after receiving a wake-up signal in the form of a power-up command, the activation-sensing unit may at least partially return to an operating condition.

According to one embodiment, a player may insert payment for play into the remote activation assembly, during which time the player assign credits to a particular entertainment unit by selecting that particular entertainment unit or type of entertainment unit for play at the remote activation assembly. Alternatively, the remote activation assembly may assign the player to a particular entertainment unit. According to other embodiments, the player may assign the entertainment unit the credits are to be assigned by engaging an activation mechanism at that particular entertainment unit.

The player may then engage an activation mechanism at the selected or assigned entertainment unit. For example, the activation mechanism may be a coin slide that the player pushes, or button the player presses. Engagement of the activation mechanism may cause a wake-up signal to be transmitted to the activation-sensing unit.

Once awoken, the activation-sensing unit may transmit one or more signals to the remote activation assembly or to a processor in the entertainment unit inquiring whether that particular entertainment unit has been assigned any play credits and/or the number of play credits available. If no play credits, or an insufficient number of credits for play, are available for that entertainment unit, the remote activation assembly or the processor in the entertainment unit may not transmit a reply to this signal(s) or may issue a reply indicating that play is not to commence at that entertainment unit. The activation-sensing unit may then return to the sleep mode. Further, if there are not sufficient credits for play, activation mechanism, such as a coin slide, may remain in a locked position If, however, a sufficient number of play credits are assigned to that entertainment unit, an activation signal may be transmitted to the activation-sensing unit that allows for play to commence. For example, the remote activation assembly may transmit an activation signal to the activation-sensing unit that allows for pool balls at a pool table to be released from a ball retention compartment to an area accessible to the players. Alternatively, an activation signal may instruct the activation-sensing unit to unlock the activation mechanism, for example unlocking a coin slide so that the slide mechanism may travel the distance required to release the pool balls from the ball holding rack.

In another embodiment of the present invention, after the processor in the remote activation assembly has sensed the receipt of an appropriate amount of payment for play, the remote activation assembly may transmit a wake-up signal to the activation-sensing unit of the selected or assigned entertainment unit. The wake-up signal may take the activation-sensing unit out of a sleep mode. The activation-sensing unit may also receive signals from the remote activation assembly indicating the number of play credits assigned to the entertainment unit, or indicating that play is to commence at that entertainment unit. For example, in embodiments in which the entertainment unit is a pool table, the remote activation assembly may transmit an activation signal to the activation-sensing unit, which may result in the opening or unlocking of the gate at the end of the ball retention compartment or unlocking of the activation mechanism. Alternatively, receipt of the activation signal may result in the coin slide being unlocked, whereby the slide mechanism may be allowed to be pushed the required distance into the entertainment unit to release the pool balls from the ball holding rack.

According to one embodiment, the remote activation assembly may track the number of remaining play credits available at a particular table. Alternatively, the entertainment unit or the activation-sensing unit may include a processor that may track the number remaining play credits.

The deduction of play credits by the remote activation assembly, by a processor at the entertainment unit, and/or by the activation-sensing unit may occur at a number of different times. According to one embodiment, the deduction of play credits may occur at a predetermined time after the player has first engaged the activation mechanism. By delaying the deduction of credits, a player may not lose additional credits for engaging the activation mechanism multiple times within a short time span. For example, according to embodiments in which the entertainment unit is a pool table, play credits may not be deducted until a predetermined time after the pool balls have been initially released from the ball retention compartment. According to such an embodiment, in the event that not every pool ball was initially released from the ball retention compartment, the player may engage the activation mechanism, or the activation signal may be re-sent, one or more additional times, in an attempt to have the remaining pool balls released, without having additional play credits deducted.

Embodiments of the present invention also provide a pool table system that is configured to automatically score a pool-based game. The system includes a pool table having a playing surface, rails, pockets, and pool balls, wherein each of the pool balls includes a detectable feature. The system also includes a scoring processor, and a ball detection sensor in communication with the scoring processor.

The ball detection sensor is positioned such that the pool balls pass by the ball detection sensor after the pool balls enter the pockets. The ball detection sensor detects the detectable feature as the pool balls pass by the ball detection sensor. The ball detection sensor relays a data signal to the scoring processor as the pool balls pass by said detection sensor.

Each of the detectable features outputs a unique signal for each of the pool balls. The embedded detectable device may include at least one of an antenna, microchip, metallic security tag, magnet, and an ultrasonic emitter. Optionally, the detectable feature may be a unique marking, such as a bar code, number, color scheme/configuration or the like, that is detected by an optical sensor. The scoring processor distinguishes among the pool balls based on the data signals received.

Embodiments of the present invention also provide a method of automatically scoring a pool-based game played on a pool table having a playing surface, rails, pockets, and pool balls having embedded detectable devices therein. The method includes locating a ball detection sensor at a position where the pool balls pass after the pool balls enter the pockets, detecting the embedded detectable devices within the pool balls as the pool balls pass by the ball detection sensor, and relaying a data signal based on the detecting to a scoring processor.

Additionally, embodiments of the present invention provide a method of manufacturing a pool game system that is configured to automatically score a pool-based game, wherein the pool game system comprises a pool table having pool balls positioned over a playing surface bounded by rails and pockets. The method includes embedding detectable devices within the pool balls, wherein each of the pool balls includes one embedded detectable device that outputs a signal that is unique from output signals of other detectable devices embedded in other pool balls. The method also includes disposing ball-detecting sensors configured to detect the detectable devices at a position where the pool balls after the pool balls enter the pockets.

Further, embodiments of the present invention provide a pay-for-play parlor game system that enables game play upon receipt of a playing fee. The system includes a game unit having a playing surface and an activation-sensing unit, and a remote activation assembly. The remote activation assembly includes a processor operatively connected to a currency acceptor. The remote activation assembly transmits an activation signal that is received by the activation-sensing unit when the processor detects receipt of the playing fee. The activation-sensing unit is operable to allow a user to initiate game play when the activation-sensing unit receives the activation signal. The game unit may be a pool table, a foosball table, an air hockey table, a basketball-based game, a football based game, a hockey-based game (such as table hockey), a prediction-based game (such as a "fantasy" football or baseball league) and other games commonly found in bars and arcades.

Additional embodiments of the present invention include a system comprising an entertainment unit, an information management system having a processor operatively connected to an input device, an entertainment information unit in communication with the information management system and/or at least one entertainment unit, wherein the input device is operable to input information regarding the operation of entertainment units into a database operatively connected to the information management system. To provide more efficient tracking of game score information, the computer database may be networked to the internet, to provide up-to-date game result and scheduling information. The input device may be located at the game unit, to allow remote transmission of information (such as match scores) to a centralized computer database. The input device may include, but is not limited to, a standard computer keyboard, keypad, or touchscreen.

Embodiments of the present invention also provide a method for initiating operation of an entertainment or game unit. The method includes selecting an entertainment unit from a plurality of entertainment units; remotely transmitting an activation signal to allow game play, receiving the activation signal at the internal activation-sensing unit, and providing access to the entertainment unit upon the receiving step.

Embodiments of the present invention also provide a system that allows users to electronically input information about the operation of an entertainment unit, such as game results. The electronically input game result information may be combined with information about the operation of other systems (such as other game scores) and/or results from previous and future games, for example, to determine standings and results for a league. Further, user-inputted game information may be combined with game result information automatically scored.

Embodiments of the present invention also provide a method of electronically storing game score information from a plurality of entertainment units, either by storing manually inputted information by a user and/or by storing game score information automatically calculated from an entertainment unit that is equipped with an automatic scoring system.

Embodiments of the present invention also provide for a remote activation assembly that is operably configured to a wired or wireless location router and/or at least one entertainment unit, whereby the remote activation assembly may transfer a variety of information, for example, league schedules, statistics, standings, machine settings, and software updates, among others.

Figure 1A:
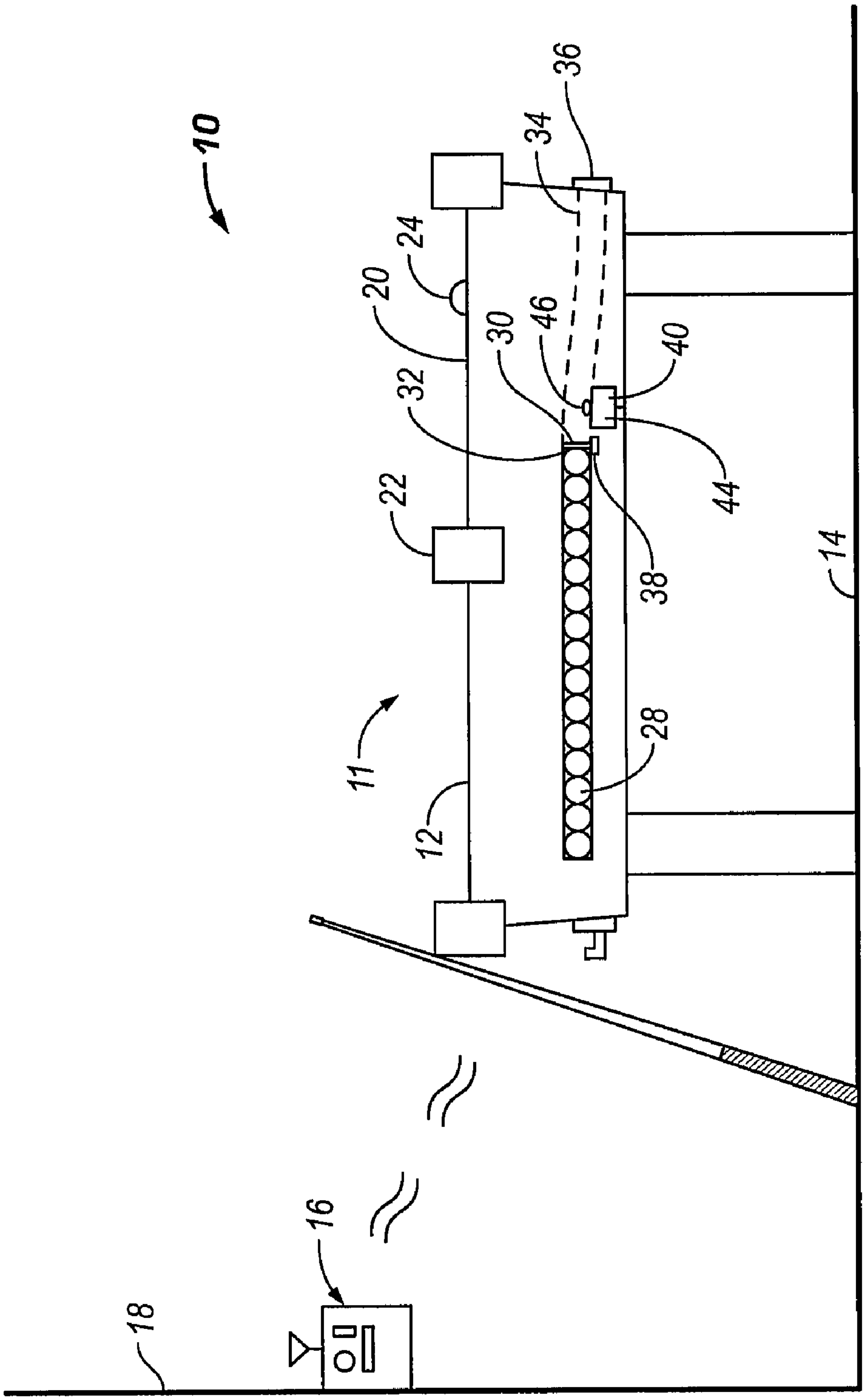
FIG. 1*a* illustrates a simplified representation of a entertainment system according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1*a* illustrates a simplified representation of an entertainment system 10 according to an embodiment of the present invention. The entertainment system 10 illustrated in Figure includes an entertainment unit 11 in the form of a pool table 12 is supported by a floor 14, and a remote activation assembly 16 mounted on a wall 18. Optionally, the remote activation assembly 16 may be an upright, stand-alone unit supported by the floor 14, or mounted to the underside of the pool table 12. In accordance with another embodiment, the remote activation assembly 16 may be a hand-held device. Further, the remote activation assembly 16 may include a display to communicate information, for example the cost to play, the number of play credits purchased, and the availability, selection, and/or assignment of a pool table 12.

The pool table 12 may be a standard pool table including a felt playing surface (not shown) bounded by rails 20 (or bumpers) and pockets 22. As shown in FIG. 1*a*, a cue ball 24 is positioned on the playing surface. The pool table 12 also includes a ball retention compartment, or holding rack, 26. The ball retention compartment 26 is connected to the pockets 22 through internal pathways (not shown) that allow numbered striped and colored balls 28 to pass from the pockets 22 into the ball retention compartment 26. A gate 30 is positioned at an outlet 32 of the ball retention compartment 26.

The gate 30 is normally in a closed position so that the balls 28 are retained within the ball retention compartment 26 and not allowed to pass into the ball delivery passage 34 (which is within the main body of the pool table 12). The ball retention compartment 26 may be sloped slightly downward, so that when the gate 30 is opened, the balls 28 pass into the ball delivery passage 34 by way of gravity. The ball delivery passage 34 is connected to an access area 36, at which a player may remove the balls 28 from the pool table 12 and proceed to place them on the playing surface in order to play pool.

Figure 1B:
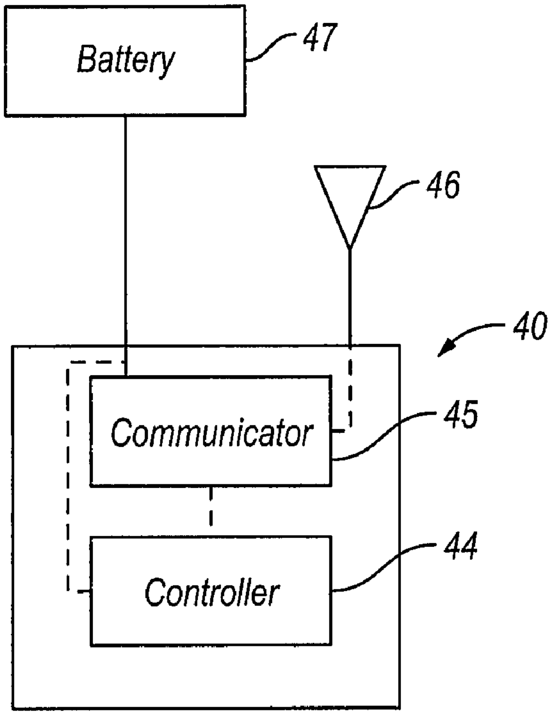
FIG. 1*b* illustrates a simplified representation of an activation-sensing unit according to an embodiment of the present invention.

FIG. 1*b* illustrates a simplified representation of an activation-sensing unit 40 according to an embodiment of the present invention. According to certain embodiments of the present invention, the activation-sensing unit 40 may include a controller 44 that and a communicator 45, for example a radio frequency (RF) module. Examples of the controller 44 include, but are not limited to, a micro processor or other such device capable of sensing a signal received by the communicator and acting thereupon. The controller may include or be operably connected to the controller 44 and may include, or be connected by wiring, to a receiving antenna 46. However, according to other embodiments, the activation-sensing unit 40 may not include a controller 16. Further, the activation-sensing unit 40 may be powered by a battery 47.

The activation-sensing unit 40 may also be electrically connected to the opening device 38. In embodiments in which the entertainment unit 11 is a pool table 12, the opening device 38 may include a solenoid, latch, clasp, motor or the like, that is configured to open and close the gate 30.

The activation-sensing unit 40, and more specifically, the communicator, wirelessly may receive signals, such as RF signals from the remote activation assembly 16 by way of the receiving antenna 46. The controller 44 may then analyze the received signals to determine whether to open the gate 30 in order to allow play to begin or to unlock the activation mechanism 33. That is, the remote activation assembly 16 sends an activation signal to the activation-sensing unit 40 instructing the activation-sensing unit 40 to open the gate 30 or unlock the activation mechanism 33, such as a coin slide 250, to allow players to gain access to the balls 28 through the access area 36. If the remote activation assembly 16 does not send an activation signal to the activation-sensing unit 40, the gate 30 remains closed and/or the activation mechanism 33 remains locked.

Figure 2:
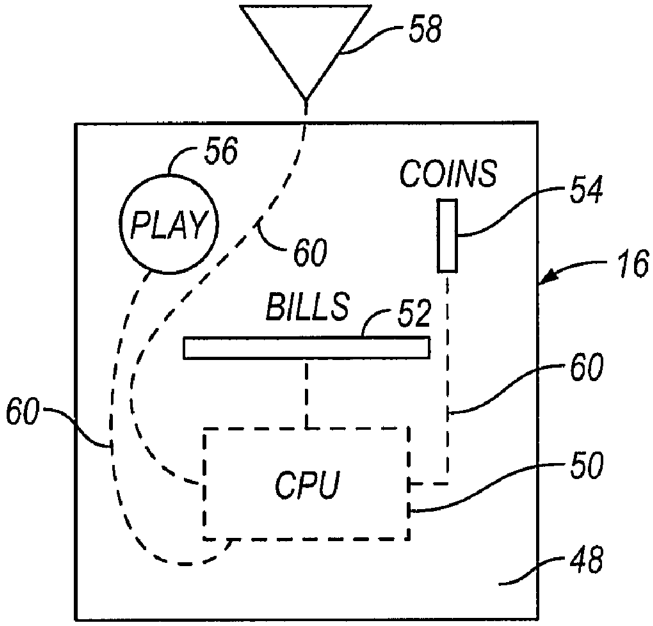
FIG. 2 illustrates a schematic diagram of a remote activation assembly according to an embodiment of the present invention.

FIG. 2 illustrates a schematic diagram of a remote activation assembly 16. The remote activation assembly 16 includes a main body 48 housing a central processing unit 50 therein. The central processing unit 50 is electrically connected to a bill acceptor 52, a coin acceptor 54, one or more user interface buttons 56 for play activation, and a transmitting antenna 58, through internal wiring 60. While the transmitting antenna 58 is shown external to the main body 48, the transmitting antenna 58 may be housed within the main body 48. Similarly, the receiving antenna 46 of the activation-sensing unit 40 may be housed within a main body of the activation-sensing unit 40 and/or integrated with the communicator, as previously discussed.

According to embodiments of the present invention, the central processing unit (CPU) 50 may be programmed to adjust the cost of play credits during different time periods of operation. For example, play credits during most hours of operation may be twice as expensive as play credits purchased during certain peak business or promotional periods, such as during a happy hour. Accordingly, the central processing unit 50 may be programmed to reduce the cost of play during these peak or promotional periods of operation.

Further, the central processing unit 50 maybe programmed to adjust the value of the play credits existing at the start of a promotional period. Accordingly, a player having play credits existing at the start of the promotional period may have the value of those credits adjusted by the central processing unit 50 so that the player receives the discount being given during the promotional period. For example, if a player has enough credits for one game of pool during normal operations when the promotional period commences, and the promotional period rate is two games for the cost of one, the central processing unit 50 may adjust that player's play credits so that the player is credited with enough play credits for two games of pool. Further, at the end of the promotional period, the central processing unit 50 may adjust the existing play credits to correspond to the current cost of play.

Further, the central processing unit 50 may be programmed to reject certain denominations or monetary amounts that are inserted into the bill acceptor 52 and/or coin acceptor. For example, the central processing unit 50 maybe programmed to reject certain bill denominations, such as large bill denominations, that are inserted into the bill acceptor 52. Further, the central processing unit 50 may be programmed to limit the amount of credits that may be purchased, assigned, or accumulate for play at a specific entertainment unit 11 during certain time periods. Such limitations may assist in allowing desired modes of play to commence at an entertainment unit 11, such as allowing for periods of challenge play by a number of different individuals at a specific entertainment unit 11. Further, the central processing unit 50 may be programmed, and/or the bill acceptor 52 may be configured, to allow accept different types of payment or bills, such as U.S. and foreign currency, or specialty bills, which may be created by the establishment operating the entertainment unit 11 or other types of organizations, among others.

According to another embodiment, after sensing the monetary amount inserted into the remote activation assembly 16, the central processing unit 50 may generate a message to be prompted on a display asking the purchaser to confirm that the desired monetary amount has been inserted. Alternatively, the prompt may inquire as to whether the player wishes the inserted amount to be credited to one entertainment unit 11, or to multiple entertainment units 11. According to some embodiments, a response for the user indicating that not all of the inserted currency is to be credited to one entertainment unit 11, for example pressing "no" on a touch screen or a user interface, may result in the currency or payment inserted into the bill acceptor 52 to be rejected and returned to the user. Such queries may be generated before or after the player engages the activation mechanism 33, such as a coin slide mechanism, as discussed in more detail below.

The remote activation assembly 16 may be powered by way an electrical utility supply, for example 120 volt AC. In another embodiment, the remote activation assembly 16 may be powered by the transmitting antenna 58 receiving radio signals from a commercial radio station. Further, the activation-sensing unit 40 may be powered by way of the receiving antenna 46 receiving radio signals from a commercial radio station. Optionally, a capacitor of sufficient storage size may be housed within the activation-sensing unit 40 in order to provide power. Further, a capacitor may be housed within the main body 48 of the remote activation assembly 16 and electrically connected to the CPU 50. Alternatively, the remote activation assembly 16 may be electrically connected to a standard electrical outlet, or it may be battery 47 powered.

Figure 7:
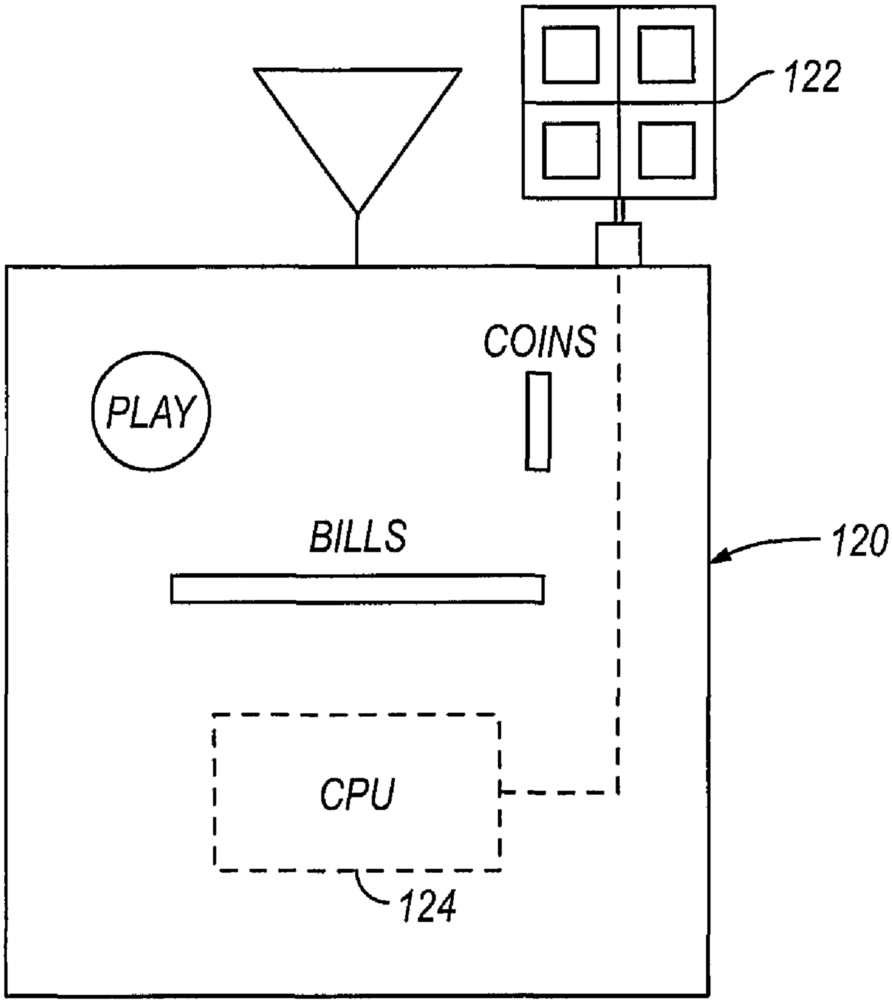
FIG. 7 illustrates a remote activation assembly according to an alternative embodiment of the present invention.

FIG. 7 illustrates a remote activation assembly 120 according to an alternative embodiment of the present invention. The remote activation assembly 120 includes a solar cell 122 that may assist in providing electrical power to the CPU 124. The remote activation assembly 120 may be powered through solar power. The solar cell 122 may be mounted at various positions of the remote activation assembly and may be electrically connected to an internal power reservoir, the coin/bill acceptor, and the like. Similarly, the activation-sensing unit 40 may also be electrically connected to, and receive power from, a solar cell.

Referring again to FIGS. 1 and 2, a player inserts currency into the remote activation assembly 16 through the bill acceptor 52 and/or the coin acceptor 54. Once the currency is input into the remote activation assembly 16, the CPU 50 determines the amount entered. If the input amount is sufficient for game play, the CPU 50 sends an activation signal to the activation-sensing unit 40 through the transmitting antenna 58 when the user interface button(s) 56 is depressed. The activation-sensing unit 40 then opens the gate 30, thereby causing the balls 28 to pass to the access area 36. If the input amount is insufficient for game play, the CPU 50 does not send an activation signal to the activation-sensing unit 40.

Figure 3:
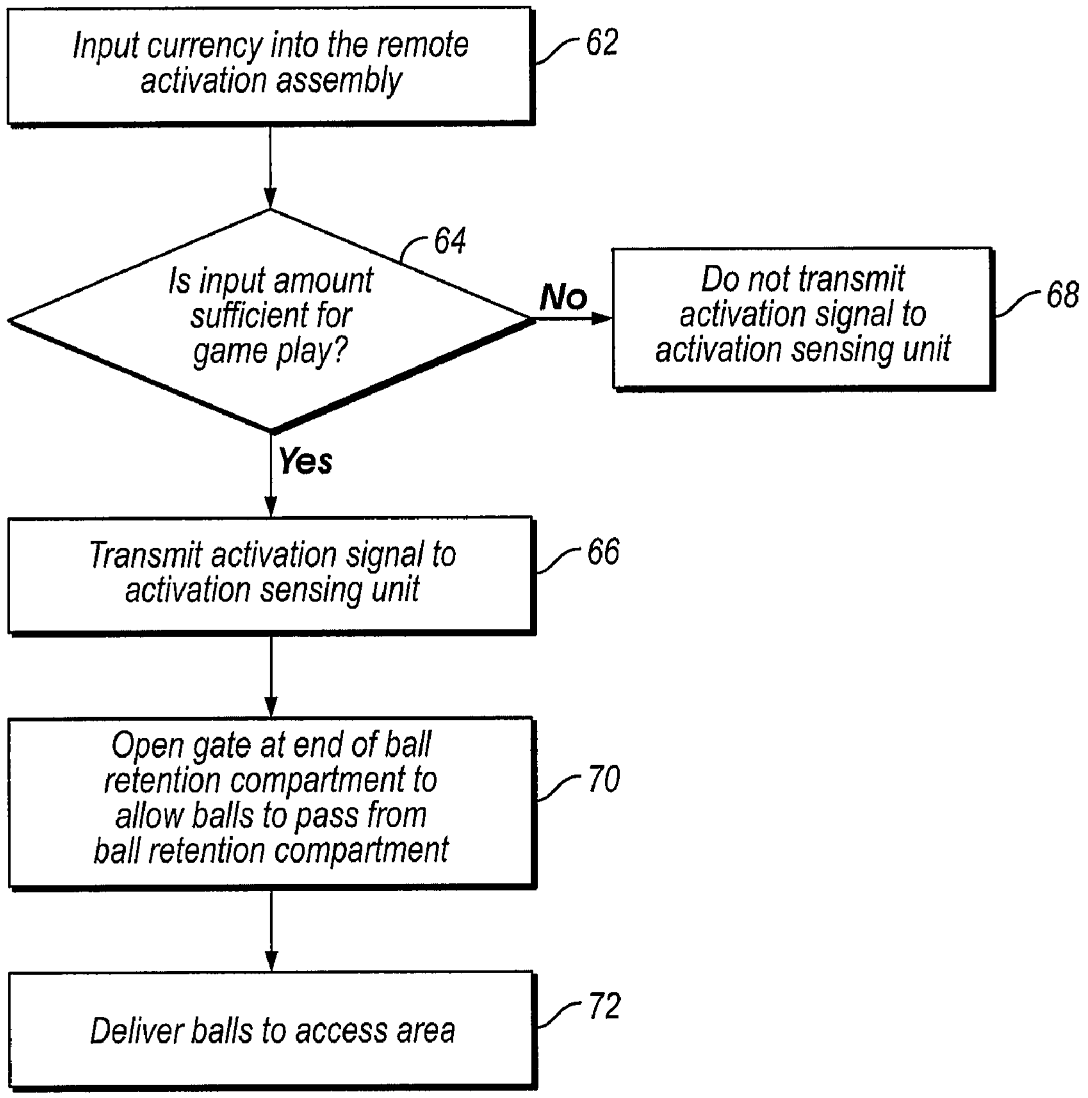
FIG. 3 illustrates a flow chart for a method of activating a entertainment system according to an embodiment of the present invention.

FIG. 3 illustrates a flow chart for activating a entertainment system 10 according to an embodiment of the present invention. At 62, a player inputs currency into the remote activation assembly 16. At 64, the remote activation assembly 16 determines whether the input amount is sufficient for game play. If the amount is sufficient, the remote activation assembly 16 transmits an activation signal to the activation-sensing unit 40, which is housed within the pool table 12 at 66. If, however, the amount is insufficient, the remote activation assembly 16 does not transmit an activation signal to the activation-sensing unit 40 at 68.

The activation-sensing unit 40 opens the gate 30 at 70 once it receives the activation signal. At 72, the balls 28 then pass to the access area 36 where a player may then remove the balls 28 from the pool table 12 and place the balls 28 on the playing surface.

Figure 4:
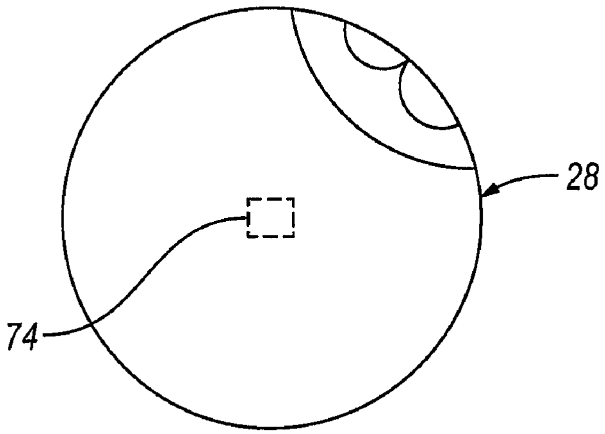
FIG. 4 illustrates a pool ball according to an embodiment of the present invention.

FIG. 4 illustrates a pool ball 28 according to an embodiment of the present invention. The pool ball 28 may be any pool ball (e.g., an 8-ball, 9-ball, cue ball, and the like). Embedded within the ball 28 is a detectable device 74. The detectable device 74 may be a transmitting or receiving antenna or microchip, a metallic security tag, a magnet, an ultrasonic emitter or sensor, or various other such devices capable of transmitting or receiving a signal in relation to a corresponding detector (e.g., a receiving or transmitting antenna, an electromagnetic sensor, an ultrasonic detector, and the like). Preferably, the detectable device 74 is a radio frequency coded antenna embedded within each ball 28 during a ball manufacturing process.

In order to ensure smooth and even movement of the pool ball 28, the detectable device 74 is preferably symmetrically positioned about the center of gravity of the pool ball 28. Optionally, the detectable device 74 may be various shapes and sizes and may be embedded within the pool ball 28 at various positions.

Figure 5:
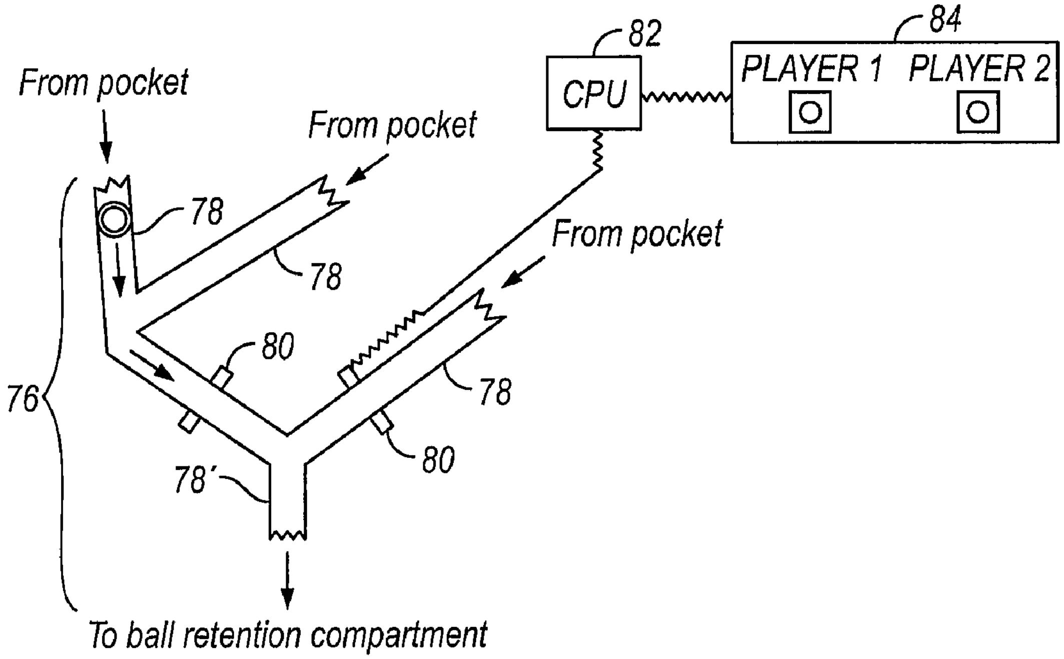
FIG. 5 illustrates a simplified representation of a ball return and scoring system according to an embodiment of the present invention.

FIG. 5 illustrates a simplified representation of a ball return and scoring system 76 according to an embodiment of the present invention. The system 76 is located within the main body of the pool table 12. The system includes a series of tubes, channels or the like (hereinafter "tubes") 78. The tubes 78 connect the pockets 22 to the ball retention compartment 26.

Ball sensors 80 are positioned over a portion of the tubes 78. Optionally, each pocket 22 may include a ball sensor 80. While two ball sensors 80 are shown, the system 76 may include more ball sensors 80. Optionally, the system 76 may include one ball sensor 80 located over the tube 78' that connects directly to the ball retention compartment 26. The sensors 80 are in communication with a central processing unit (CPU) 82, which is in turn in operative communication with a scoring display 84. The sensors 80 relay ball sensing data to the CPU 82 when the balls 78 pass through the sensors 80. The CPU 82 then analyzes the ball sensing data and displays scoring information based on the ball sensing data on the scoring display 84.

The sensors 80 may be radio frequency sensors that sense a radio frequency output of a detectable device 74 within a particular ball 28 as it passes through (or proximate) a sensor 80. Optionally, the detectable device 74 may be a magnet and the sensors 80 may be an electromagnetic sensing unit that detects the electromagnetic field produced by the magnet within the ball 28 as it passes through (or proximate) the sensor 80. Optionally, the sensors 80 may be configured to detect ultrasonic frequencies output by the detectable devices 74. Various types of detection systems may be used with various types of signal output devices known in the art. Each detectable device 74 may output a specific signal, such as a particular radio frequency. Thus, each ball 28 may include a detectable device 74 outputting a unique signal.

Alternatively, the balls 28 may be detected through optical sensors. Each ball 28 may include a particular distinguishing mark located somewhere on its outer surface. For example, the detectable device may be a bar code located on the surface of a ball 28. The distinguishing mark may also be the number on the ball and/or ball color or color configuration (e.g., striped or solid). Each ball may include a unique distinguishing mark that is distinct from marks on other balls. Each distinguishing mark may be associated with a particular ball. The sensors 80 may be optical sensors, such as laser, infrared emitters, or the like. The optical sensors may be capable of reading bar codes, numbers, and/or ball colors, stripes, and the like. The unique signal output may be the distinguishing mark that is detected by the optical sensor.

Regardless of the type of signal output by a ball 28 (e.g., an RF signal, a distinguishing mark, and the like), the CPU 82 correlates the unique signal with a particular ball 28. For example, the 8 ball may output a signal at a first radio frequency, while a cue ball may output a signal at a second frequency, and the 9 ball may output a signal at a third radio frequency, and so on. The CPU 82 distinguishes between balls 28 through the detection of different signals.

Figure 6:
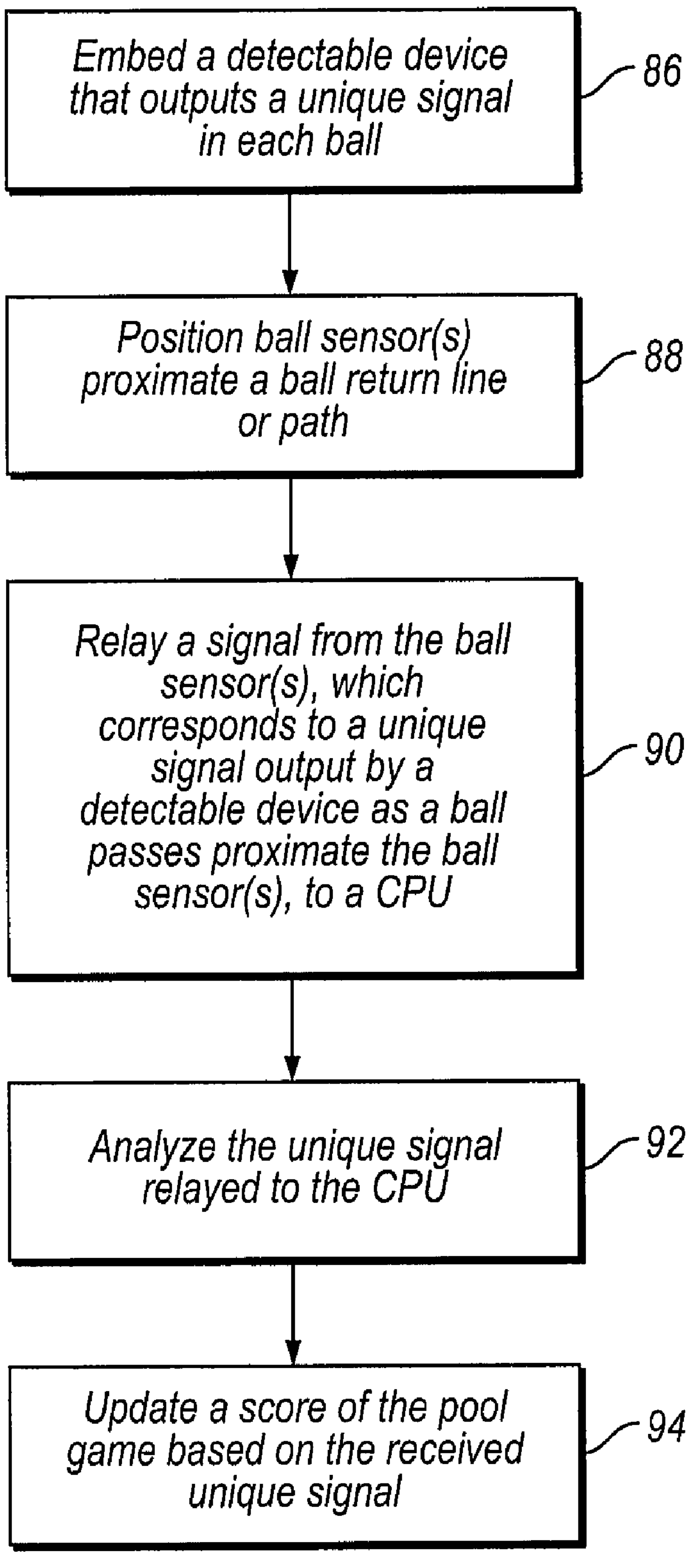
FIG. 6 illustrates a flow chart for a method of providing a pool table system that is capable of automatically scoring a game of pool according to an embodiment of the present invention.

FIG. 6 illustrates a flow chart for a method of providing a pool table system that is capable of automatically scoring a game of pool according to an embodiment of the present invention. At 86, pool balls 28 are manufactured with embedded detectable devices 74. Each detectable device 74 outputs a unique signal that is different than any other detectable device 74. Each ball 28 is associated with a unique signal that is output by a detectable device embedded within the particular ball 28.

A pool table is manufactured having at least one ball sensor 80 positioned proximate a ball return line at 88. As the pool balls 28 pass through the ball return line, the ball sensor(s) 80 relays a data signal indicative of the detectable device embedded within the pool ball 28 to a CPU 82 as the ball 28 passes by the ball sensor(s) 80 at 90. The CPU 82 then analyzes the received data signal and associates the received data signal with a particular pool ball 28 at 92. The CPU 82 then updates a game score based on the received data signal on a score display 84 at 94.

To ensure that the correct player's score is credited or adjusted for each score during play, the entertainment unit 11, and more particularly the CPU 82, may be operably connected to a player change switch. According to such an embodiment, during game play, before a player takes his or her turn, or after the previous player's turn is over, the player change switch may be activated. Activation of the player change switch may electronically communicate to the CPU 82 that it the next player's turn for play so that scoring is credited to the correct player. For example, during pool play, upon the complete of player one's turn, the player change switch may be pressed so as to indicate to the CPU that it is now player two's turn, and that any subsequent scoring is to be appropriately credited to player two. At the completion of player two's turn, the player change switch may again be activated so as to let the CPU know that the scoring is to be credited to the next player, whether it be player one's turn again or another player. According to certain embodiments of the present invention, the player change switch may be a return-to-neutral switch.

According to embodiments of the present invention, the at least one ball sensor 80, or other such sensors for other types of entertainment units 11, and/or the CPU or scoring processor may be a in an energy conserving sleep mode before, during, and/or after game play at the entertainment unit 11. According to such an embodiment, at least a portion of the electrical circuitry and components associated with updating and/or tracking game score information may be in an energy saving sleep mode until the score needs to be updated, which may occur at predetermined time intervals or upon a change in game score. For example, in embodiments in which the entertainment unit 11 is a pool table 12, the sinking of a pool ball(s) 28 in a pocket(s) 22, or the travel of a pool ball 28 though the internal pathways as it moves to the ball retention compartment 26 may activate a switch. The activation of the switch may result in a wake-up signal being communicated to the electrical circuitry and components associated with updating and/or tracking game score information, thereby awakening these components or circuitry from an energy conserving sleep mode. The awoken scoring circuitry may then update the scoring accordingly. Once the score has been updated, the awoken scoring circuitry may then return to a sleep mode.

Figure 8:
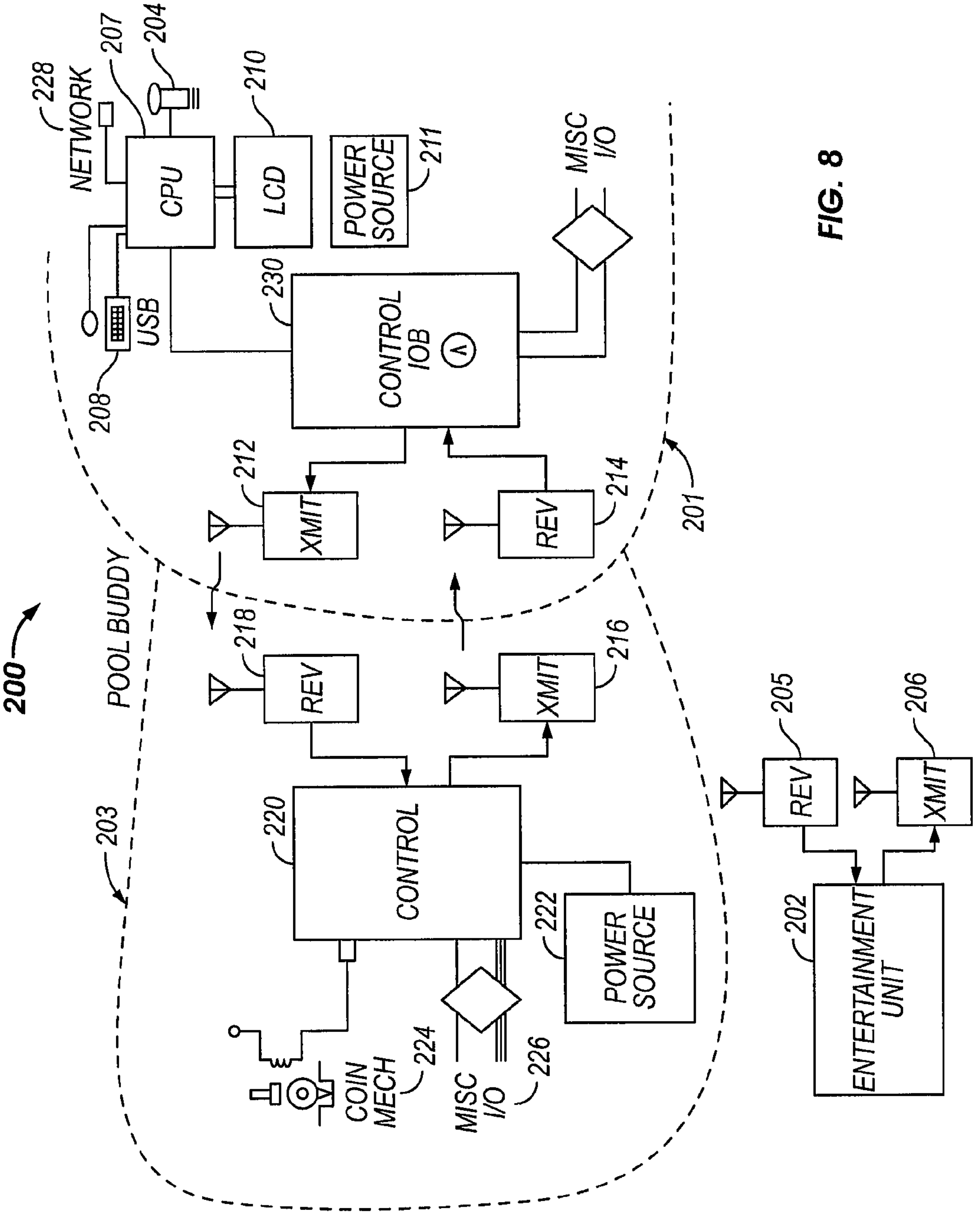
FIG. 8 illustrates a schematic representation of a system for remote activation of entertainment units (such as pool tables, dart machines, prediction-based games, or the like), optionally including the ability to report information about the operation of the entertainment unit (such as game score information) to a computer database.

FIG. 8 illustrates a schematic representation of a system for remote activation of game units 200. The system 200 includes an information management system 201 in communication with an entertainment unit 202 and an entertainment information unit 203, which may be separate and distinct from the information management system 201. The information management system 201 may optionally store information about the operation of an entertainment unit 202. The entertainment information unit 203 is in communication with at least one entertainment unit 202. The entertainment information unit 203 may be used to remotely activate one or more entertainment units 202 and/or to store information, such as the results of a game played at an entertainment unit. Information from the entertainment information unit 203 may be transmitted to the information management system 201 to be stored on a computer database 204.

The entertainment unit 202 may be a pool table, dart machine, prediction-based game (such as "fantasy football"), a hockey-based game, a foosball table, or the like. Optionally, the entertainment unit 202 may be equipped with a receiver 205 to receive an activation signal and/or other information from the entertainment information unit 203 and/or information management system 201. The entertainment unit 202 may also be equipped with a transmitter 206 to transmit information (such as availability for use or game scores) to the entertainment information unit 203 and/or to the information management system 201.

The information management system 201 includes a CPU 207 which is connected to one or more input devices 208 via a standard connection such as Universal Serial Bus (USB). The input device 208 may comprise a standard computer keyboard, mouse, keypad, touchscreen or the like. The input device 208 may allow a user to, among other things, select, reserve and remotely activate an entertainment unit 202 from among available entertainment units, or to input game score information upon completion of play. Game score information may include information such as the score of the match, the winning and losing individuals or teams, the entertainment unit where the match was played, and the date and time the game was played.

The input device 208 and CPU 207 may be connected to a display screen 210 and power source 211. The display screen 210 can be used for many purposes, including: displaying game unit availability; allowing a user to select from available game units; displaying game score information and league standings. The display screen 210 may also display advertising or other pertinent messages associated with the bar or game parlor. Optionally, the information management system 201 may be integrated with a jukebox (not shown) and/or a dart game machine, such as shown and described in U.S. application Ser. No. 10/073,486, which was previously incorporated by reference in its entirety. For example, the input device 208 and display screen 210 may assist the user in selecting music, game stations, or the like, which can connect to an audio data decoder to respond to the user's choice of music. Additionally, the information management system 201 may be integrated with a system of organizing a predictions based game, such as described in U.S. Provisional Application No. 60/660,487, previously incorporated by reference. The input device 208 and display screen 210 may assist the user in inputting and/or viewing predictions in relation to a sporting event, such as the outcome of a match, the score, the individual performance of players, or other similar statistical or outcome-based predictions.

The information management system 201 may include a transmitting antenna 212 and a receiving antenna 214. These may be used to communicate with the entertainment information unit 203 and/or one or more entertainment units 202.

In addition, the information management system 201 may include an input-output control board 230, which is operatively connected to or integrated with the CPU 207. The input-output control board 230 can coordinate the reception and transmission of signals from a plurality of entertainment units 202 and/or the entertainment information unit 203.

The information management system 201 may also be connected to a remote computer network 228. Connecting the information management system 201 to a remote network 228 allows for remote access (for example, via the World Wide Web) of game score information and other information compiled in the computer database 204 of the information management system 201. This allows for users and interested persons to view game score information, and, if desired, to generate league standing information. If desired, users could also communicate with the information management system 201 to reserve and select from available game units prior to arriving at the arcade, bar, or game parlor. Connection to the remote computer network may be by standard methods such as Internet Protocol or the like. Further, the information management system 201 may connect to the networks of other entertainment units, thereby allowing the information management system 201 network access as a slave unit.

According to embodiments of the present invention, the remote network 228 may be a central management station. The central management station may allow for the management of leagues. More specifically, league related information and files may be remotely uploaded or downloaded to the central management station, including, but not limited to, league information relating to schedules, teams, play statistics, and standings. For example, information inputted by players or operators into the information management system 201, or information detected by the information management system 201, may be conveyed to the central management station. According to certain embodiments, the central management station may reside on a operator's personal computer or on the internet.

The entertainment information unit 203 may comprise a control board 220 connected to a power source 222, a currency acceptor 224, such as a coin slide, and other input/output devices 226. The currency acceptor 224 may receive bills and or coins to activate a pay-for-play entertainment unit 202. In addition, when configured with a user input device and a display screen, the entertainment information unit 203 can allow players to, among other things, reserve or select from among available entertainment units 202 for play. The power source 222 can be configured to receive power from a wall outlet, from a single battery 47 or series of batteries, a solar power cell, or the like. The configuration may vary depending upon whether it is convenient to attach the power source 222 to an electrical outlet, or whether the entertainment information unit 203 is positioned such that electrical attachment is inconvenient—for example, if the entertainment information unit 203 is to be portable within the bar or gaming establishment.

The entertainment information unit 203 may further comprise a transmitting antenna 216 and a receiving antenna 218. The transmitting antenna 216 allows for transmission of information, such as an activation signal, to an entertainment unit 202 receiving antenna 205. The entertainment unit 202 may include an activation-sensing unit such as activation-sensing unit 40 in FIG. 1 and already described herein. The activation-sensing unit may send an activation signal to an entertainment unit 202 in order to activate the entertainment unit 202 for operation. Upon activation for operation, the entertainment unit 202 may be programmed to confirm that the unit is ready for operation. For example, the entertainment unit 202 may be programmed to illuminate an LED indicator light on the unit (not shown), or emit an audio tone to confirm that the entertainment unit 202 has received an activation signal and is ready for operation. The entertainment information unit 203 allows for collection and receipt of payment, as well as coordination and selection of entertainment units 202, to occur at one convenient location. Because the entertainment unit 202 could be activated by a remote activation signal rather than through input of currency into a currency acceptor, less power may be required for each entertainment unit 202 in order to remain ready and/or to activate operation of the unit. This is beneficial to extend the life of the battery 47 for entertainment units 202 that are battery-powered or not otherwise connected to an electrical outlet. The entertainment information unit 203 may thus allow for a central and an efficient location to collect funds for game play.

In FIG. 8, transmissions from the entertainment unit 202 to the entertainment information unit 203 and/or information management system 201 may include a signal to verify receipt of a previous radio transmission, such as an activation signal. This transmission may be accompanied by a corresponding message on a display screen connected to the entertainment information unit 203 or information management system 201, indicating that the desired entertainment unit 202 is ready for use.

Additionally, an entertainment unit 202 may transmit, to the entertainment information unit 203 and/or information management system 201, game score information upon completion of a match, so that the game score can be electronically stored in a computer database 204. The game score may be automatically computed and transmitted without human intervention, if the particular game unit 202 is equipped with an automatic scoring feature, such as that depicted in FIGS. 5 and 6 for a pool table.

Alternatively, information about the operation of an entertainment unit 202, such as a game score, may be input by a user through an input device located at either the entertainment unit 202, the entertainment information unit 203, or the information management system 201. If the information is input at either the entertainment unit 202 or the entertainment information unit 203, the information may be subsequently transmitted to the information management system 201 for storage in a computer database 204. Entering game score information at the entertainment unit 202, either by means of an automatic scoring or by an input device located at the entertainment unit 202 (not shown), may be preferable in some instances to avoid heavy congestion of users near the entertainment information unit 203 and/or the information management system 201.

To save equipment costs and power at entertainment unit 202, the system 200 may alternatively include only one-way communications from the information management system 201 and/or entertainment information unit 203 to the entertainment unit 202. This embodiment allows for the desirable features of remote activation but without the need for additional equipment and power to transmit information from the entertainment unit 202 to the information management system 201 and/or entertainment information unit 203. However, this embodiment may still allow centralized storage of game score information, for example, if upon completion of a match, players or parlor staff enter game score information through an input device operatively connected to the information management system 201. For embodiments employing one-way communications from the information management system 201 and/or entertainment information unit 203 to the entertainment unit 202, redundant communications may be used in order to ensure that the entertainment unit 202 receives the activation signal and is properly activated for use.

As shown in FIG. 8 and described above, communications between an entertainment information unit 203, an information management system 201, and one or more entertainment units 202 may be enabled. Preferably, communications can occur by means of radio frequency transmissions, for example, on the low power ISM bands between 315 MHz and 433.92 MHz, as prescribed by FCC part 15. The radio transmissions may also employ standard encryption technology, such as those employed in other remote activation devices such as garage door openers and auto theft detection alarms. Alternatively, the information management system 201, the entertainment information unit 203, and entertainment units 202 may communicate through a variety of wired and wireless communication systems, such as modems, bus lines, Ethernet connections, "wi-fi" systems, and the like.

Returning to FIG. 8, in some embodiments the entertainment unit 202 may be equipped with a currency acceptor (not shown). This allows users to activate and use the entertainment unit 202 in situations where the entertainment information unit 203 and/or information management system 201 is inoperative. Optionally, the currency acceptor may be a device configured to read magnetic strips, such as those from credit cards. As such, the entertainment unit 202 may be configured to receive payment through a debit card or credit card.

Figure 9:
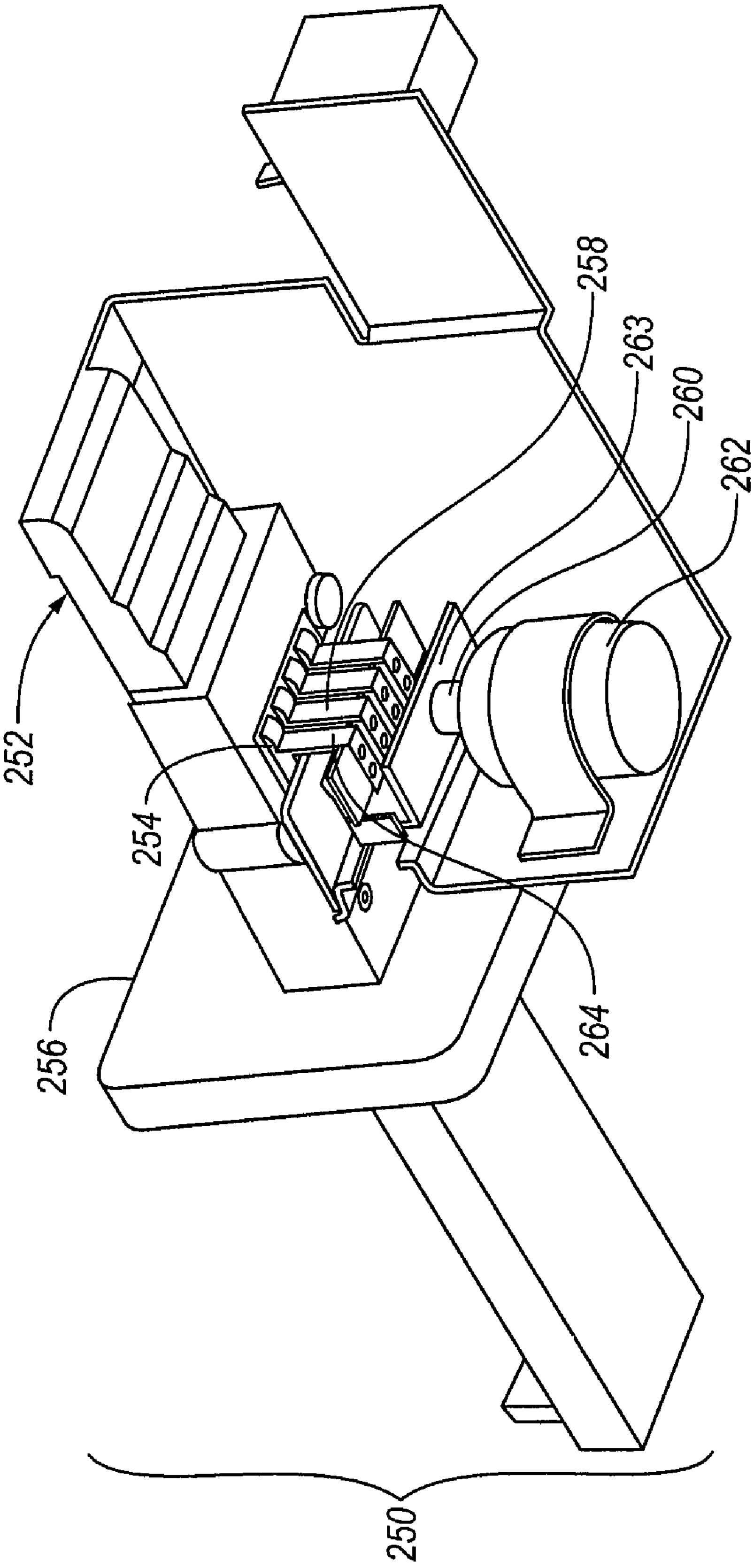
FIG. 9 illustrates a coin slide that may be used in embodiments of the present invention.

FIG. 9 illustrates a coin slide 250 that may be used in embodiments of the present invention. The coin slide 250 may be initially fabricated using a standard, off-the-shelf coin slide 250, such as those that may be purchased in bulk from a variety of different vendors, and are frequently used to collect game fees for parlor games such as pool tables. In FIG. 9, the coin slide 250 comprises a standard slide mechanism 252 with coin slots 254 on a mounting bracket 256. In the example embodiment shown, the bottom of the coin slots 254 is visible; coins may be inserted from the top. The coin lockout pawls 258 ensure the proper movement of the coin slide mechanism 252 to activate the game when the appropriate game fee is inserted.

The coin slide 250 may further comprise a permanent magnet 260, an electromagnet 262, and a lockout pawl commoning bar 263. An electrical pulse to the electromagnet 262 operates to change the magnetic field and to cause a lockout pawl pull down lever 264 to move. When the lockout pawl pull down lever 264 moves, it allows the slide mechanism 252 to operate in the same manner as if a user had inserted the proper game fee into the coin slots 254. In this way, the coin slide 250 allows activation of a parlor game unit via at least two different methods: insertion of the appropriate game fee into coin slots 254, and/or via an electrical pulse sent to the electromagnet 262. Further, the electromagnet 262 may be actuated upon the entertainment unit receiving a remote activation signal. Thus, the coin slide 250 may be used with a system for remote activation of game units, such as the system 200 shown in FIG. 8. Alternatively, the entertainment unit configured with a coin slide 250 as shown in FIG. 9 may be activated upon insertion of the proper game play fee. The coin slide 250 shown in FIG. 9 is further advantageous because it requires little electrical power to maintain state, resulting in longer battery 47 life if the coin slide 250 is not connected to an electrical outlet. An electrical pulse, rather than continuous power, is required to alter the state of the coin slide 250 to allow activation of an entertainment unit or to reset the entertainment unit to prevent activation until a game play fee is inserted and/or a remote activation signal is received.

Figure 10:
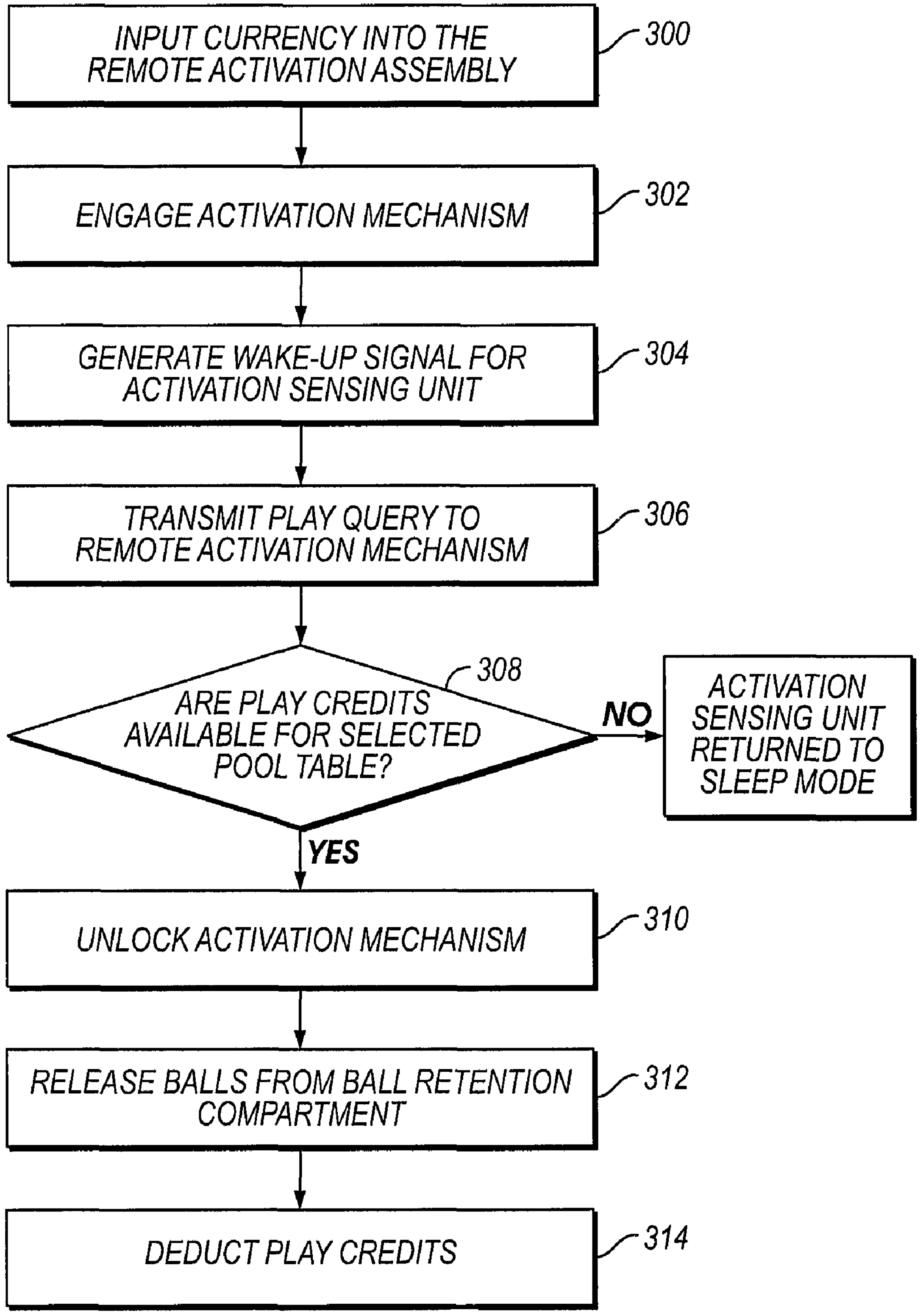
FIG. 10 illustrates a flow chart of a method for activation of an entertainment unit in which a wake-up signal is transmitted to the activation-sensing unit through the engagement of an activation mechanism, according to one embodiment of the present invention.

FIG. 10 illustrates a flow chart of a method for activation of an entertainment unit 11 in which a wake-up signal is transmitted to the activation-sensing unit 40 through the engagement of an activation mechanism 33, according to one embodiment of the present invention. According to such embodiments, the activation-sensing unit 40 and/or other electronics at an entertainment unit 11 may enter into a sleep mode after a specified duration of inactivity. For example, according to embodiments in which the activation-sensing unit 40 includes a controller 44, the controller 44 may be programmed to enter into a sleep mode after a designated duration of inactivity, and remain in a sleep mode until being awoken by a wake-up signal, as discussed below in more detail.

However, according to other embodiments, the activation sensing-unit 40 may include, or be operably connected to, a digital/analog circuit that may be utilized for a wake-up and/or sleep mode for the activation-sensing unit 40 and/or other electronics at the entertainment unit 11. For example, a minimal power drain timer, which may or may not be powered up at all times, may receive an activation signal that triggers a wake-up logic signal. This wake-up logic signal may result in a switch/relay closure powering up other portions of the digital/analog circuit, the activation-sensing unit 40, and/or other electronics at an entertainment unit 11. According to such an embodiment, after timer has finished its fixed timing duration, a switch/relay may be opened, thereby returning circuitry and electronics to a sleep mode.

At 300, a player inserts currency into the remote activation assembly 16. If multiple entertainment units or multiple types of entertainment units are available, the player may be assigned an entertainment unit 11 by selecting at the remote activation assembly 16 the type and/or location of the entertainment unit 11 he or she may wish to play. Alternatively, the remote activation assembly 16 may assign the player to an entertainment unit 11. According to another embodiment, the player may be assigned an entertainment unit 11 by engaging an activation mechanism 33, such as by pushing, or attempting to push, a coin slide 250 into a pool table 12.

At 302, the player may engage the activation mechanism 33 at the selected or assigned entertainment unit 11, for example a coin slide 250 at a pool table 12. At least the partial engagement of the activation mechanism 33 may result in the generation of a wake-up signal for the activation-sensing unit 40. For example, by at least partially pushing the slide mechanism 252 of a coin slide 250 into a pool table 12, a switch, such as a reed switch, among others, may be triggered into an open or closed position. The triggering of the switch may cause the generation and/or transmission of an electrical signal to the activation-sensing unit 40. For example, the triggering of the switch may cause an electrical signal transitioning on a designated pin, which results in the controller 44 waking up and executing program commands.

However, according to other embodiments, the selection of the entertainment unit 11 to be played may be made at the entertainment unit 11 by the engagement of the activation mechanism 33. For example, rather than select the entertainment unit 11 at the remote activation assembly 16, as previously discussed, the entertainment unit 11 having the activation mechanism 33, such as a coin slide, that is first activated after sufficient play credit has been inserted into the remote activation assembly may be the entertainment unit 11 selected for play. Accordingly, the allocation of the credits may then be assigned to that particular entertainment unit 11.

According to certain embodiments, the awoken activation-sensing unit 40 may transmit a play query to the remote activation assembly 16 at 306. The play query may inquire as to whether that particular entertainment unit 11 has been selected for play and/or the assignment of play credits to that unit. According to embodiments of the present invention, transmissions to and/or from the remote activation assembly 16 and the activation-sensing unit may be a radio wave transmissions. For example, the transmissions may be in low power ISM band of 315 MHZ and 433.92 MHz. Further, algorithms may be employed to provide that the secure transmission of the radio waves.

According to other embodiments, rather than transmit a play query, the activation-sensing unit 40 may stay awoken for a period of time while waiting to receive an activation signal (i.e. a pool ball release signal). Such an activation signal may be transmitted from the remote activation assembly 16 or a processor in the entertainment unit 11. After a predetermined time period, if the activation-sensing unit 40 does not receive, or sense the receipt of, the activation signal, the activation-sensing unit 40 and/or other electronics at the entertainment unit 11 may return to a sleep mode.

At 308, if that particular entertainment unit 11 has not been selected for play and/or there are not sufficient play credits, the activation-sensing unit 40 may return to a sleep-mode.

Additionally, according to one embodiment, if the entertainment unit 11 has not been selected for play, the activation mechanism 33 may remain in a locked position. For example, if the activation mechanism 33 is a coin slide 250, the slide mechanism 252 of the coin slide 250 may be locked so that it cannot travel the distance required to allow for play to commence, such as the distance required to release the pool balls 28 from the holding rack 26.

Conversely, if there sufficient credits for play are available, the activation-sensing unit 40 may receive an activation signal. Receipt of an activation signal may result in the unlocking of the activation mechanism 33 at 310. For example, the activation mechanism 33 may be a coin slide 250 that includes a slide mechanism 252 that is controlled by a magnetically operated latch, such as a electro-magnet/permanent magnet combination. After the activation signal has been received, a solenoid may release the latch, thereby allowing the slide mechanism 252 to be pushed the required distance into the pool table 12 to allows the pool balls 28 to be released from a holding rack 26. After the release of the balls 28, the latch may be reset, thereby again locking the slide mechanism until an activation signal is again received. Alternatively, the receipt of the activation signal by the activation-sensing unit 40 may result in the operation of the opening device 38. For example, the receipt of the activation signal by the activation-sensing unit 40 may result in the operation of a motor or solenoid that is operably connected to the gate 30, and which may open the gate 30 so as to release poll balls 28 from the holding rack 26.

The remote activation assembly 16, activation-sensing unit 40, or a processor at the entertainment unit 11 may track the number of remaining play credits available at the entertainment unit 11. At 314, the number of play credits used for playing the entertainment unit 11 are deducted. The deduction of play credits may occur at a number of different times. For example, in one embodiment, the deduction of play credits may occur after the unlocking of the activation mechanism 33. According to other embodiments, play credits may not be deducted for a predetermined time after the activation mechanism 33 has been unlocked or play has been initiated, such as the release of at least some of the pool balls 28. According such embodiments, by delaying the time for the deduction of credits, in the event that play cannot commence, such as not all of the pool ball 28 being released, the player may try to re-initiate the commencement of the game. For example, the player may engaging the activation mechanism 33 one or more additional times in an attempt to have all of the remaining pool balls released, without having additional play credits deducted.

Following the completion of play, the player(s) may return to the remote activation assembly 16 and enter game play results. Alternatively, play results may be entered at the entertainment unit 11, or recorded during the playing session by the entertainment unit 11. According to such an embodiment, upon completion of play, or during a contest, game play results and status may be transmitted from the entertainment unit 11 to the remote activation assembly 16.

Embodiments of the present invention also provide for confirming transmitted information that has been received by the remote activation assembly 16 or the activation-sensing unit 40. For instance, embodiments of the invention may provide for the remote activation assembly 16 having electronic transmission capabilities. According to such embodiments, the activation-sensing unit 40 and/or the selected entertainment unit 11 may be able to provide confirmation to the remote activation assembly 16 of information being received by the activation-sensing unit 40 through the use of a visual or audio signal. For instance, after information has been received by the activation-sensing unit 40, the activation-sensing unit 40 may confirm receipt of the information by issuing a signal that causes an LED light to blink, or the release of an audio tone, which is detected by a sensor that is operably connected to the remote activation assembly 16.

Figure 11:
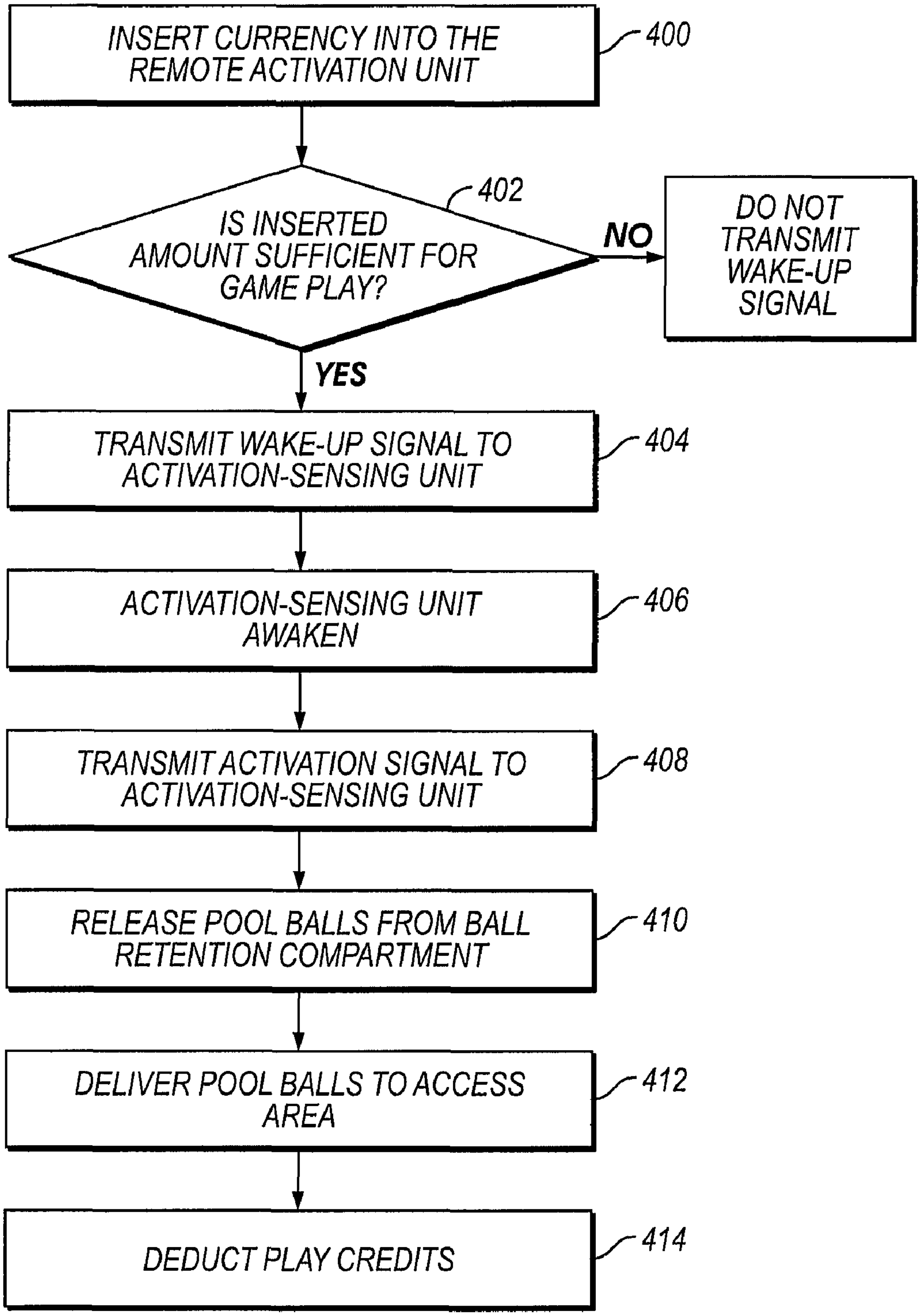
FIG. 11 illustrates a flow chart of a method for remote activation of an entertainment unit in which a wake-up signal is transmitted from a remote activation assembly to the activation-sensing unit of the entertainment unit, according to one embodiment of the present invention.

FIG. 11 illustrates a flow chart of a method for remote activation of an entertainment unit 11 in which a wake-up signal is transmitted from a remote activation assembly 16 to the activation-sensing unit 40 of the entertainment unit 11, according to one embodiment of the present invention. At 400, a player inserts currency into the remote activation assembly 16, and may select or be assigned the particular entertainment unit 11 to be played. At 402, the remote activation assembly 16 determines whether the amount of the inserted currency is sufficient for game play.

If the amount of the currency inserted is sufficient, then at 404 the remote activation assembly 16 may transmit a wake-up signal to the communicator of the activation-sensing unit 40 of the entertainment unit 11. Prior to the receipt of the wake-up signal, the activation-sensing unit 40 may be in a sleep-mode, during which the electrical power used by the activation-sensing unit 40, for example electrical power supplied by a battery 47, may be at least partially conserved. Accordingly, at 406 the activation-sensing unit 40 may be awoken from the sleep-mode.

At 408, the activation-sensing unit 40 may receive an activation signal from the remote activation assembly 16. The activation-sensing unit 40 may then allow game play to initiate. For example, in embodiments in which the entertainment unit 11 is a pool table 12, an activation signal sent to the activation-sensing unit 40 may activation the opening device 38, such as triggering a motor or solenoid valve that is operably connected to the gate 30 to open the ball retention compartment, such as the holding rack, 28, thereby releasing the pool balls 28 to an access area 36. Once the balls 28 have been released, the activation-sensing unit 40 may return to a sleep mode until an wake-up signal is again generated and/or transmitted by either the engagement of the activation mechanism 33 or from the remote activation assembly 16.

The number of play credits used for playing the entertainment unit 11 are deducted at 414. As discussed above, the number of play credits may be tracked by the remote activation assembly 16, the activation-sensing unit 16, or a processor at the entertainment unit 11. Additionally, as also previously discussed, the credits may be deducted at a number of different times.

Alternatively, rather than transmitting an activation signal, the remote activation assembly 16 may transmit the number of play credits available for the entertainment unit 11 to the activation-sensing unit 40 or a processor at the entertainment unit 11. As long as there is a sufficient number of credits for play, the activation mechanism 33 may be in an unlocked position, thereby allowing subsequent play to commence. However, at a predetermined time after no play credits remain, or an insufficient number of credits remain for play, the activation-sensing unit 40 may return to a sleep mode, and the activation mechanism 33 may be in a locked position.

Embodiments of the present invention also provide for a remote activation assembly 16 that is operably configured to a wired or wireless location router and/or at least one entertainment unit 11. According to such an embodiment, the router may be used by the remote activation assembly 40 to transfer a variety of type of information to, or from, players and/or entertainment units. For example, the router may transmit league schedules, statistics, standings, and machine settings, among others. Further, the router may be used provide software updates to entertainment units.

Embodiments of the present invention also provide for a remote activation assembly 16 that is operably connected to, or includes, a modem. The modem may be operably connected to a telephone line. According to one embodiment, the modem may allow for phone calls to be received at, or sent from, the remote activation assembly 16. For example, a phone call over a telephone wire may be sent to, or received at, the modem from a operator's facility.

Further, according to certain embodiments, the remote activation assembly 16 may include, or be operably connected to, a modem that allows the remote activation assembly 16 to connect to the internet. More particularly, the remote activation assembly 16 may include a modem that may allow for a hard-wired or wireless connection to the internet through an RS485 interface or Ethernet connection.

While the systems and methods discussed above relate to standard pool tables, embodiments of the present invention may be used with various types of pool-type games, including, but not limited to, billiards, snooker, and bumper pool. Additionally, embodiments of the present invention may also be used with foosball tables, basketball and football based games in which a player throws balls at a hoop and/or target, air or table hockey games, or various other parlor games commonly found in bars and arcades.

Embodiments of the present invention may also be used with a combination dart and jukebox machine, such as described in U.S. application Ser. No. 10/073,486, which was previously incorporated by reference. For example, the information management system 201 may communicate with and store activation information and game or music information in the computer database 204. Additionally, embodiments of the present invention may also be used with a predictions based game, such as described in U.S. Provisional Application 60/660,487, previously incorporated by reference. For example, the information management system 201 may store game information from the prediction based game, in combination with other game information and/or league standings for other types of games. This may be desirable, for example, to allow teams or individuals to access their scores and league standings in the variety of leagues in which the individuals or teams compete. In addition, combining the information management system 201 with a prediction based game may allow league play and league standings where individuals or teams compete in both the prediction based game as well as another parlor game, such as pool or darts.

Thus, embodiments of the present invention provide a system and method for activating a pool table through a remote activation device. The remote activation device may accept coins or bills. Further, embodiments of the present invention provide a system and method for automatically scoring a game of pool.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of initiating play on an entertainment unit, the method comprising:

inserting currency into the currency acceptor of a remote activation assembly;

engaging an activation mechanism on an entertainment unit, the entertainment unit including an activation-sensing unit;

generating a wake-up signal to awaken the activation-sensing unit from a sleep mode; and transmitting a query from the activation-sensing unit to the remote activation assembly, the query seeking information as to whether play may commence at the entertainment unit.

2. The method of claim 1 wherein the step of transmitting a query comprises inquiring whether a sufficient number of credits are available for play at the entertainment unit.

3. The method of claim 1 wherein the step of transmitting a query comprises inquiring whether the entertainment unit has been selected for play.

4. The method of claim 1 further including the step of transmitting a response from the remote activation assembly to query from the activation-sensing unit, the response providing an indication of whether play is to commence at the entertainment unit.

5. The method of claim 4 further including the step of unlocking the activation mechanism.

6. The method of claim 5 wherein the entertainment unit is a pool table.

7. The method of claim 1 including the step of selecting an entertainment unit for play at the remote activation assembly.

8. The method of claim 7 wherein the step of selecting an entertainment unit for play comprises being assigned an entertainment unit by the remote activation assembly.

9. The method of claim 7 wherein the step of selecting an entertainment unit comprises engaging the activation mechanism at the entertainment unit.

10. The method of claim 1 including the step of deducting play credits for the total of play credits purchased.

11. The method of claim 10 wherein deducting play credits comprises deducting play credits at a predetermined time after play has been permitted to commence at the entertainment unit.

12. The method of claim 1 wherein generating a wake-up signal comprises the triggering of a switch by engaging the activation mechanism, the triggering of a switch causing a wake-up signal to be generated for the activation-sensing unit.

13. The method of claim 1 wherein generating a wake-up signal comprises transmitting a wake-up signal from the remote activation assembly.

14. The method of claim 1 wherein the remote activation assembly includes a central processing unit, the central processing unit being programmed to adjust a play credit value during promotional periods.

15. The method of claim 1 wherein the remote activation assembly includes a central processing unit, the central processing unit being programmed to limit the amount of play credits assigned to the entertainment unit.

16. The method of claim 1 further including communicating play information between a central management station and the remote activation assembly.

17. The method of claim 1 wherein the remote activation assembly is operably connected to a modem.

18. A method of initiating play on an entertainment unit, the method comprising:

inserting currency into the currency acceptor of a remote activation assembly;

selecting an entertainment unit for play;

engaging an activation mechanism on the entertainment unit, the entertainment unit including an activation-sensing unit, the engagement of the activation mechanism generating a wake-up signal to awaken activation-sensing unit from a sleep mode;

transmitting a query from the activation-sensing unit to the remote activation assembly, the query seeking information as to whether sufficient credits for play are available at the entertainment unit;

transmitting a response from the remote activation assembly to the activation-sensing unit, the response providing an activation signal if sufficient credits are available for play; and deducting play credits for the total of play credits purchased.

19. The method of claim 18 wherein the activation signal comprises signaling to unlock the activation mechanism.

20. The method of claim 19 wherein the entertainment unit is a pool table.

21. The method of claim 18 wherein selecting an entertainment unit for play comprises being assigned an entertainment unit by the remote activation assembly.

22. The method of claim 18 wherein selecting an entertainment unit for play comprises selecting the entertainment unit at the remote activation assembly.

23. The method of claim 18 wherein the step of selecting an entertainment unit comprises engaging the activation mechanism at the entertainment unit.

24. A method of initiating play on an entertainment unit, the method comprising:

inserting currency into the currency acceptor of a remote activation assembly;

selecting an entertainment unit for play;

transmitting a wake-up signal from the remote activation assembly to the selected entertainment unit to awaken activation-sensing unit from a sleep mode;

generating an activation signal, the activation signal allowing play to commence at the entertainment unit; and deducting play credits for the total of play credits purchased.

25. The method of claim 24 wherein the entertainment unit is a pool table.

26. A pool table system that is configured to automatically score a pool-based game, the system comprising a pool table comprising:

a playing surface, rails, pockets, and pool balls, wherein each of the pool balls comprise a detectable feature;

a scoring processor;

a ball detection sensor in communication with the scoring processor, the ball detection sensor being positioned such that the pool balls pass by the ball detection sensor after the pool balls enter the pockets, wherein the ball detection sensor detects the detectable features as the pool balls pass by the ball detection sensor, and wherein the ball detection sensor relays a data signal to the scoring processor as the pool balls pass by the ball detection sensor; and a switch in communication with the scoring processor, the switch being positioned such that the pool balls pass by the switch after the pool balls enter the pockets, wherein the activation of the switch triggers a wake-up signal for the scoring processor, the wake-up signal awakening the scoring processor from a energy conserving sleep mode.

27. The pool table system of claim 26 further including a player change switch, the player change switch being in communication with the scoring processor, the activation of the player change switch changing which player the scoring processor is to credited for a subsequent scoring play.

28. A method of initiating play on an entertainment unit, the method comprising:

inserting currency into a currency acceptor of a remote activation assembly;

determining the value of the currency inserted into the currency acceptor;

selecting the entertainment unit for play;

inquiring whether all of the currency inserted into the currency acceptor is to be credited to one entertainment unit; and rejecting the currency inserted into the currency acceptor if the currency inserted is not to be credited to one entertainment unit.

29. The method of claim 28 wherein the entertainment unit is a pool table.

* * * * *